United States Patent
Park et al.

(10) Patent No.: US 12,355,059 B2
(45) Date of Patent: Jul. 8, 2025

(54) METHOD OF PREPARING ELECTRODE FOR LITHIUM SECONDARY BATTERY AND ELECTRODE FOR LITHIUM SECONDARY BATTERY PREPARED BY USING THE SAME

(71) Applicant: LG ENERGY SOLUTION, LTD., Seoul (KR)

(72) Inventors: Sol Ji Park, Daejeon (KR); Kyoung Ho Ahn, Daejeon (KR); Jun Hyeok Han, Daejeon (KR); Chul Haeng Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 735 days.

(21) Appl. No.: 17/288,396

(22) PCT Filed: Oct. 18, 2019

(86) PCT No.: PCT/KR2019/013780
§ 371 (c)(1),
(2) Date: Apr. 23, 2021

(87) PCT Pub. No.: WO2020/085726
PCT Pub. Date: Apr. 30, 2020

(65) Prior Publication Data
US 2021/0359287 A1 Nov. 18, 2021

(30) Foreign Application Priority Data
Oct. 26, 2018 (KR) ........................ 10-2018-0128788

(51) Int. Cl.
*H01M 4/04* (2006.01)
*H01M 4/66* (2006.01)
*H01M 10/0562* (2010.01)
*H01M 10/0567* (2010.01)
*H01M 10/0569* (2010.01)

(52) U.S. Cl.
CPC ....... *H01M 4/0452* (2013.01); *H01M 4/0404* (2013.01); *H01M 4/667* (2013.01); *H01M 10/0562* (2013.01); *H01M 10/0567* (2013.01); *H01M 10/0569* (2013.01); *H01M 2300/0028* (2013.01); *H01M 2300/0051* (2013.01); *H01M 2300/0057* (2013.01); *H01M 2300/008* (2013.01)

(58) Field of Classification Search
CPC .. H01M 4/0452; H01M 4/0404; H01M 4/667; H01M 10/0562; H01M 10/0567; H01M 10/0569; H01M 2300/0028; H01M 2300/0051; H01M 2300/0057; H01M 2300/008; H01M 4/137; H01M 2300/0022; H01M 2300/0068; H01M 2300/0082; H01M 2300/0094; H01M 4/1391; H01M 2004/027; H01M 2004/028; H01M 4/131; H01M 4/134; H01M 4/382; H01M 4/525; H01M 4/587; H01M 4/62; H01M 4/139; C25D 9/02; C25D 9/04
See application file for complete search history.

(56) References Cited

U.S. PATENT DOCUMENTS

| 4,869,977 A * | 9/1989 | Connolly .......... H01M 10/0563 429/105 |
| 4,891,281 A * | 1/1990 | Kuo ........................ H01M 6/14 429/105 |
| 6,709,789 B1 | 3/2004 | Hambitzer et al. |
| 10,263,293 B2 | 4/2019 | Yu et al. |
| 11,831,019 B2 * | 11/2023 | Ishii ................. H01M 10/0525 |
| 2011/0177388 A1 | 7/2011 | Bae et al. |
| 2014/0011101 A1 | 1/2014 | Ma et al. |
| 2016/0072153 A1 | 3/2016 | Ichikawa et al. |

(Continued)

FOREIGN PATENT DOCUMENTS

| CN | 105684208 A | 6/2016 |
| CN | 107078346 A | 8/2017 |

(Continued)

OTHER PUBLICATIONS

International Search Report (with partial translation) and Written Opinion issued in corresponding International Patent Application No. PCT/KR2019/013780, dated Jan. 23, 2020.

(Continued)

*Primary Examiner* — Matthew T Martin
*Assistant Examiner* — Bartholomew A Hornsby
(74) *Attorney, Agent, or Firm* — Morgan, Lewis & Bockius LLP

(57) ABSTRACT

The present invention provides a method of preparing an electrode for a lithium secondary battery which includes forming a first electrolyte layer by immersing an electrode current collector in a composition for forming the first electrolyte layer and applying a current, and forming a second electrolyte layer by immersing the electrode current collector having the first electrolyte layer formed thereon in a composition for forming the second electrolyte layer and applying a current, wherein one of the composition for forming the first electrolyte layer and the composition for forming the second electrolyte layer is a composition for forming an organic electrolyte layer, and another one is a composition for forming an inorganic electrolyte layer, and the composition for forming an inorganic electrolyte layer includes a compound represented by Formula 1.

18 Claims, No Drawings

(56) References Cited

U.S. PATENT DOCUMENTS

| | | | |
|---|---|---|---|
| 2016/0254572 A1* | 9/2016 | Yu | H01M 4/661 |
| | | | 429/126 |
| 2017/0030996 A1 | 2/2017 | Fireaizen et al. | |
| 2017/0222244 A1* | 8/2017 | Kim | H01M 10/0525 |
| 2017/0309961 A1 | 10/2017 | Lim et al. | |
| 2018/0090743 A1 | 3/2018 | Jeong et al. | |
| 2018/0090786 A1 | 3/2018 | Jeong et al. | |
| 2018/0205112 A1* | 7/2018 | Thomas-Alyea | H01M 10/05 |

FOREIGN PATENT DOCUMENTS

| | | |
|---|---|---|
| CN | 108063271 A | 5/2018 |
| JP | 2016-058250 A | 4/2016 |
| KR | 10-2009-0091659 A | 8/2009 |
| KR | 10-2014-0006639 A | 1/2014 |
| KR | 10-1346414 B1 | 1/2014 |
| KR | 10-2016-0018913 A | 2/2016 |
| KR | 10-2016-0018914 A | 2/2016 |
| KR | 10-2016-0032773 A | 3/2016 |
| KR | 10-2016-0038735 A | 4/2016 |
| KR | 10-2017-0024862 A | 3/2017 |
| KR | 20170024862 A * | 3/2017 |
| KR | 10-2017-0092327 A | 8/2017 |
| KR | 10-2018-0020631 A | 2/2018 |
| KR | 20180020631 A * | 2/2018 |
| KR | 10-2018-0035971 A | 4/2018 |
| KR | 10-2018-0084681 A | 7/2018 |
| KR | 10-1869805 B1 | 7/2018 |

OTHER PUBLICATIONS

Extended European Search Report dated Oct. 20, 2021 issued by the European Patent Office in corresponding European patent application No. 19875433.5.
Office Action issued in Chinese patent application 201980070826.6 dated Jun. 22, 2023.

* cited by examiner

METHOD OF PREPARING ELECTRODE FOR LITHIUM SECONDARY BATTERY AND ELECTRODE FOR LITHIUM SECONDARY BATTERY PREPARED BY USING THE SAME

CROSS-REFERENCE TO RELATED APPLICATIONS

This application claims priority from Korean Patent Application No. 2018-0128788, filed on Oct. 26, 2018, the disclosure of which is incorporated by reference herein.

TECHNICAL FIELD

The present invention relates to a method of preparing an electrode for a lithium secondary battery and an electrode for a lithium secondary battery which is prepared by using the same, and more particularly, to a method of preparing an electrode for a lithium secondary battery, which may reduce interfacial resistance of an electrode by forming both an organic electrolyte layer and an inorganic electrolyte layer on a surface of the electrode, and an electrode for a lithium secondary battery which is prepared by using the same.

BACKGROUND ART

There is a need to develop technology for efficiently storing and utilizing electrical energy as personal IT devices and computer networks are developed with the development of information society and the accompanying dependency of society as a whole on the electrical energy is increased.

Among the technologies developed for this purpose, a technology based on secondary batteries is the most suitable technology for various applications. Since a secondary battery may be miniaturized to be applicable to a personal IT device and may be applied to an electric vehicle and a power storage device, there emerges an interest in the secondary battery. Among these secondary battery technologies, lithium secondary batteries, which are battery systems having the theoretically highest energy density, are in the spotlight, and are currently being used in various devices.

In general, since a potential of a negative electrode is lower than a potential window of an electrolyte used in a lithium secondary battery, the electrolyte is reduced and decomposed on the negative electrode in an activation or charge/discharge stage of the battery. A product of the electrolyte thus reduced and decomposed transmits lithium ions, but forms a solid electrolyte interphase (SEI) capable of suppressing an additional decomposition reaction of the electrolyte.

The lithium secondary battery has a limitation in that interfacial resistance of an electrode is increased during charge and discharge or storage, and capacity is reduced. One of the causes of this limitation is an additional decomposition reaction of a salt included in the electrolyte.

For example, if the salt included in the electrolyte causes an additional reaction even after the SEI is formed on the negative electrode as the lithium secondary battery is operated, only a thickness of a portion of the SEI is further increased so that a thickness of the SEI may be non-uniform. The initially formed SEI may be rather damaged by the additional reaction of the electrolyte. As a result, the electrolyte may cause a chain decomposition reaction and may cause self-discharge of the negative electrode.

Also, if the SEI is incompletely formed, since the additional decomposition reaction of the electrolyte solution is not suppressed and interfacial resistance is increased at the same time while the SEI is damaged, a potential of the entire battery may be reduced and capacity characteristics of the battery may be degraded. Particularly, since the additional decomposition reaction of the electrolyte solution may occur more actively when the battery is overcharged, the above-described limitation may not only occur, but a heat generation and ignition phenomenon in the battery due to the increase in interfacial resistance may also become an issue.

Recently, research on applying a solid polymer electrolyte and a solid electrolyte to batteries has been actively conducted to improve safety of the battery, wherein, with respect to the electrolyte in the form of a solid, there is a limitation in that it is more affected by interfacial resistance than a case where an electrolyte in the form of a liquid or gel is applied to the battery.

Furthermore, recently, in relation to electrolyte components, there has been an increase in attempts to introduce an inorganic electrolyte in addition to an organic electrolyte, wherein there is a limitation in that the inorganic electrolyte is also more affected by interfacial resistance.

Thus, a method of forming a stable organic-inorganic electrolyte layer on an electrode in advance and suppressing damage to the electrolyte layer by introducing the electrode into a battery may be devised.

PRIOR ART DOCUMENT

Korean Patent Application Laid-open Publication No. 10-2016-0038735

DISCLOSURE OF THE INVENTION

Technical Problem

An aspect of the present invention provides a method of preparing an electrode for a lithium secondary battery, which may reduce interfacial resistance and improve capacity characteristics, life characteristics, and high-temperature stability by forming chemically and mechanically stable organic electrolyte layer and inorganic electrolyte layer on a surface of the electrode, and an electrode for a lithium secondary battery which is prepared by using the same.

Technical Solution

According to an aspect of the present invention, there is provided a method of preparing an electrode for a lithium secondary battery which includes: forming a first electrolyte layer by immersing an electrode current collector in a composition for forming the first electrolyte layer and applying a current; and forming a second electrolyte layer by immersing the electrode current collector having the first electrolyte layer formed thereon in a composition for forming the second electrolyte layer and applying a current, wherein one of the composition for forming the first electrolyte layer and the composition for forming the second electrolyte layer is a composition for forming an organic electrolyte layer, and another one is a composition for forming an inorganic electrolyte layer, and the composition for forming an inorganic electrolyte layer comprises a compound represented by Formula 1.

  [Formula 1]

M is a metallic element selected from the group consisting of lithium (Li), sodium (Na), potassium (K), and rubidium (Rb), M' is a metallic element selected from the group consisting of aluminum (Al), gallium (Ga), indium (In), and titanium (Ti), X is a halogen element selected from the group consisting of fluorine (F), chlorine (Cl), bromine (Br), and iodine (I), n is an integer of 1 to 6, and m is an integer of 1 to 10.

For example, the composition for forming the first electrolyte layer may be the composition for forming an organic electrolyte layer, and the composition for forming the second electrolyte layer may be the composition for forming an inorganic electrolyte layer.

As another example, the composition for forming the second electrolyte layer may be the composition for forming an inorganic electrolyte layer, and the composition for forming the second electrolyte layer may be the composition for forming an organic electrolyte layer.

The composition for forming an organic electrolyte layer includes an organic solvent, wherein the organic solvent may include at least one compound selected from the group consisting of a halogen element-substituted or unsubstituted carbonate-based compound, a halogen element-substituted or unsubstituted acetate-based compound, a halogen element-substituted or unsubstituted glyme-based compound, a halogen element-substituted or unsubstituted ether-based compound, and a halogen element-substituted or unsubstituted nitrile-based compound.

The composition for forming an organic electrolyte layer may include a lithium salt.

Also, the composition for forming an organic electrolyte layer further includes an additive, wherein the additive may include at least one compound selected from the group consisting of vinylene carbonate, vinylethylene carbonate, propanesultone, propenesultone, lithium difluoro(oxalato) phosphate, lithium difluoro(oxalato)borate, lithium tetrafluorooxalate phosphate, succinonitrile, succinic anhydride, ethylene sulfate, ethylene glycol bis(propionitrile) ether, lithium tetrafluoroborate, fluoroethylene carbonate, and lithium difluorophosphate.

For example, the compound represented by Formula 1 may include at least one compound selected from the group consisting of $LiAlCl_4\text{-}3(SO_2)$ and $NaAlCl_4\text{-}2(SO_2)$.

In this case, the composition for forming an inorganic electrolyte layer may further includes an inorganic ionic liquid.

According to another aspect of the present invention, there is provided an electrode for a lithium secondary battery which includes an electrode current collector and an organic electrolyte layer and inorganic electrolyte layer on the electrode current collector, wherein the inorganic electrolyte layer is formed by reduction of the compound represented by Formula 1.

In this case, the organic electrolyte layer and the inorganic electrolyte layer may be mixed and present in one layer.

Advantageous Effects

If an electrode is prepared by using a method of preparing an electrode for a lithium secondary battery according to the present invention, since both chemically and mechanically stable organic electrolyte layer and inorganic electrolyte layer are already formed on the electrode, interfacial resistance in the battery is low and high-temperature stability and capacity characteristics of the battery are also excellent.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the present specification are used to merely describe exemplary embodiments, but are not intended to limit the invention. The terms of a singular form may include plural forms unless referred to the contrary.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

<Method of Preparing Electrode for Lithium Secondary Battery>

A method of preparing an electrode for a lithium secondary battery according to the present invention includes steps of:

(1) forming a first electrolyte layer, and (2) forming a second electrolyte layer.

Hereinafter, each step will be described.

(1) First Electrolyte Layer Formation Step

First, a composition for forming a first electrolyte layer, which is used to form a first electrolyte layer on an electrode current collector, is prepared.

As the electrode current collector, a metal thin film itself may be used or a based material, on which an electrode active material is formed, may be used.

A metal used in the metal thin film may include at least one metal selected from the group consisting of copper, nickel, and lithium or a combination thereof.

The metal thin film may have a single layer structure or a multilayer structure, and, in a case in which the metal thin film is a metal thin film having a multilayer structure, the metal thin film may include at least one metal layer containing lithium.

As a specific example, in a case in which the metal thin film is composed of at least one metal selected from the group consisting of copper and nickel or a combination thereof, the metal thin film may further include a metal layer containing lithium on a surface thereof. In this case, as a method of further including the metal layer containing lithium, conventional methods of forming a metal layer, for example, rolling, sputtering, or electroplating a lithium metal on the metal thin film, may be used without limitation.

In a case in which the metal thin film further including the metal layer containing lithium is used as described above, when lithium ions ($Li^+$) are introduced through the first electrolyte layer during charge of a battery to be deposited as a lithium metal, the lithium ions may be more uniformly deposited in terms of surface energy than a case where a metal thin film without the metal layer containing lithium is used. The reason for this is that the lithium ions are deposited as the lithium metal in the form of a granule or layer, instead of a needle-like shape, in terms of surface energy.

In a case in which the base material, on which the electrode active material is formed, is used as the electrode current collector, the base material generally has a thickness of 3 μm to 500 μm. The base material is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used.

In a case in which the electrode for a lithium secondary battery to be prepared is a positive electrode, a compound capable of reversibly intercalating and deintercalating lithium may be used as the electrode active material, and the electrode active material specifically includes a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y1}Mn_{Y1}O_2$ (where 0<Y1<1), $LiMn_{2-Z1}Ni_{Z1}O_4$ (where 0<Z1<2), etc.), lithium-nickel-cobalt-based oxide (e.g., $LiNi_{1-Y2}Co_{Y2}O_2$ (where 0<Y2<1), lithium-manganese-cobalt-based oxide (e.g., $LiCo_{1-Y3}Mn_{Y3}O_2$ (where 0<Y3<1), $LiMn_{2-Z2}Co_{Z2}O_4$ (where 0<Z2<2), etc.), lithium-nickel-manganese-cobalt-based oxide (e.g., $Li(Ni_{p1}CO_{q1}Mn_{r1})O_2$ (where 0<p1<1, 0<q1<1, 0<r1<1, and p1+q1+r1=1) or $Li(Ni_{p2}Co_{q2}Mn_{r2})O_4$ (where 0<p2<2, 0<q2<2, 0<r2<2, and p2+q2+r2=2), etc.), or lithium-nickel-cobalt-transition metal (M) oxide (e.g., $Li(Ni_{p3}Co_{q3}Mn_{r3}M_{S1})O_2$ (where M is selected from the group consisting of aluminum (Al), iron (Fe), vanadium (V), chromium (Cr), titanium (Ti), tantalum (Ta), magnesium (Mg), and molybdenum (Mo), and p3, q3, r3, and s1 are atomic fractions of each independent elements, wherein 0<p3<1, 0<q3<1, 0<r3<1, 0<S1<1, and p3+q3+r3+S1=1), etc.), and any one thereof or a compound of two or more thereof may be included.

In a case in which the electrode for a lithium secondary battery to be prepared is a negative electrode, the electrode active material may include at least one negative electrode active material selected from the group consisting of natural graphite, artificial graphite, a carbonaceous material; lithium-containing titanium composite oxide (LTO); metals (Me) such as silicon (Si), tin (Sn), lithium (Li), zinc (Zn), magnesium (Mg), cadmium (Cd), cerium (Ce), nickel (Ni), or iron (Fe); alloys composed of the metals (Me); oxides of the metals (Me); and composites of the metals (Me) and carbon.

Next, the composition for forming a first electrolyte layer will be described.

The composition for forming a first electrolyte layer is to form a first electrolyte layer, wherein the first electrolyte layer may be an organic electrolyte layer or an inorganic electrolyte layer. In a case in which the first electrolyte layer is an organic electrolyte layer, a second electrolyte layer to be described layer must be an inorganic electrolyte layer, and, in a case in which the first electrolyte layer is an inorganic electrolyte layer, the second electrolyte layer to be described layer must be an organic electrolyte layer. That is, the electrode for a lithium secondary battery which is prepared according to the present invention includes both the organic electrolyte layer and the inorganic electrolyte layer, but the order is not particularly limited.

For example, in a case in which the organic electrolyte layer is first formed as the first electrolyte layer, organic electrolyte layer components may be more distributed near an interface of a working electrode, and, in contrast, in a case in which the inorganic electrolyte layer is first formed as the first electrolyte layer, inorganic electrolyte layer components may be more distributed near the interface of the working electrode. Thus, distributions of organic/inorganic components included in the electrolyte layer as well as near the electrode interface may be different depending on the formation order of the electrolyte layers. The formation order of the organic electrolyte layer or the inorganic electrolyte layer may be set according to an application field of a lithium secondary battery and a type of an electrolyte for a lithium secondary battery used accordingly.

Thus, the composition for forming a first electrolyte layer may be a composition for forming an organic electrolyte layer or a composition for forming an inorganic electrolyte layer. Hereinafter, the composition for forming each electrolyte layer will be described.

The composition for forming an organic electrolyte layer forms an organic electrolyte layer by a reduction reaction, wherein it also plays a role in transferring ions between the electrodes.

The composition for forming an organic electrolyte layer may include an organic solvent.

The organic solvent may include at least one compound selected from the group consisting of a halogen element-substituted or unsubstituted carbonate-based compound, a halogen element-substituted or unsubstituted acetate-based compound, a halogen element-substituted or unsubstituted glyme-based compound, a halogen element-substituted or unsubstituted ether-based compound, and a halogen element-substituted or unsubstituted nitrile-based compound. The halogen element is at least one element selected from the group consisting of fluorine (F), chlorine (Cl), bromine (Br), and iodine (I).

In this case, the halogen element-substituted or unsubstituted carbonate-based compound may be broadly divided into a cyclic carbonate-based compound or a linear carbonate-based compound.

Specific examples of the cyclic carbonate-based compound may be at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC).

Also, at least one selected from the group consisting of dimethyl carbonate (DMC), diethyl carbonate (DEC), dipropyl carbonate, ethylmethyl carbonate (EMC), methylpropyl carbonate, and ethylpropyl carbonate may be used as the linear carbonate compound, but the present invention is not limited thereto.

The halogen element-substituted or unsubstituted acetate-based compound may also be broadly divided into a cyclic acetate-based compound or a linear acetate-based compound.

Specific examples of the cyclic acetate-based compound may be any one selected from the group consisting of cyclic esters, such as γ-butyrolactone, γ-valerolactone, γ-caprolactone, σ-valerolactone, and ε-caprolactone, or a mixture of two or more thereof.

Furthermore, as the linear acetate-based compound, any one selected from the group consisting of linear esters, such as methyl acetate, ethyl acetate, propyl acetate, methyl propionate, ethyl propionate, propyl propionate, and butyl propionate, or a mixture of two or more thereof may be used, but the present invention is not limited thereto.

The glyme-based compound includes glyme and a polyglyme compound. As a specific example, any one selected from the group consisting of dimethyl ether ($CH_3OCH_3$), ethylene glycol dimethyl ether (CH$_3$OCH$_2$CH$_2$OCH$_3$), diethylene glycol dimethyl ether (CH$_3$(OCH$_2$CH$_2$)$_2$OCH$_3$), diethylene glycol diethyl ether (C$_2$H$_5$(OCH$_2$CH$_2$)$_2$OC$_2$H$_5$), triethylene glycol dimethyl ether (CH$_3$(OCH$_2$CH$_2$)$_3$OCH$_3$), triethylene glycol diethyl ether (C$_2$H$_5$(OCH$_2$CH$_2$)$_3$OC$_2$H$_5$), and tetraethylene glycol dimethyl ether (CH$_3$(OCH$_2$CH$_2$)$_4$OCH$_3$), or a mixture of two or more thereof may be used as the glyme-based compound, but the present invention is not limited thereto.

Also, any one selected from the group consisting of dimethyl ether, diethyl ether, dipropyl ether, methylethyl ether, methylpropyl ether, ethylpropyl ether, and 2,2-bis(trifluoromethyl)-1,3-dioxolane, or a mixture of two or more thereof may be used as the halogen element-substituted or unsubstituted ether-based compound, but the present invention is not limited thereto.

As the nitrile-based compound, any one selected from the group consisting of acetonitrile, mono-nitrile, di-nitrile, and tri-nitrile or a mixture of two or more thereof may be used, but the present invention is not limited thereto.

The composition for forming an organic electrolyte layer of the present invention may include a lithium salt.

A concentration of the lithium salt may be appropriately changed in a normally usable range, but may be included in a concentration of 0.8 M to 3.0 M, for example, 1.0 M to 3.0 M in the composition for forming an organic electrolyte layer to obtain an optimum effect of forming an anticorrosion film on the surface of the electrode. In a case in which the lithium salt is included within the above range, lithium ions may be sufficiently supplied to improve lithium ion yield (Li$^+$ transfer number) and a degree of dissociation of the lithium ions.

The lithium salt may be used without particular limitation as long as it is a compound capable of providing lithium ions used in the lithium secondary battery. For example, the lithium salt may include Li$^+$ as a cation, and one selected from the group consisting of F$^-$, Cl$^-$, Br$^-$, I$^-$, NO$_3^-$, N(CN)$_2^-$, BF$_4^-$, ClO$_4^-$, AlO$_4^-$, AlCl$_4^-$, PF$_6^-$, SbF$_6^-$, AsF$_6^-$, BF$_2$C$_2$O$_4^-$, BC$_4$O$_8^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, C$_4$F$_9$SO$_3^-$, CF$_3$CF$_2$SO$_3^-$, (CF$_3$SO$_2$)$_2$N$^-$, (FSO$_2$)$_2$N$^-$, CF$_3$CF$_2$ (CF$_3$)$_2$CO$^-$, (CF$_3$SO$_2$)$_2$CH$^-$, CF$_3$ (CF$_2$)$_7$SO$_3^-$, CF$_3$CO$_2^-$, CH$_3$CO$_2^-$, SCN$^-$, and (CF$_3$CF$_2$SO$_2$)$_2$N$^-$ or, if necessary, a mixture of two or more thereof may be used as an anion.

The composition for forming an organic electrolyte layer of the present invention may further include an additive. As specific examples of the additive, at least one compound selected from the group consisting of vinylene carbonate, vinylethylene carbonate, propanesultone, propenesultone, lithium difluoro(oxalato)phosphate, lithium difluoro(oxalato)borate, lithium tetrafluorooxalate phosphate, succinonitrile, succinic anhydride, ethylene sulfate, ethylene glycol bis(propionitrile)ether, lithium tetrafluoroborate, fluoroethylene carbonate, and lithium difluorophosphate may be used as the additive. In a case in which the listed compounds are used together as the additive, a formation reaction of a stable electrolyte layer on the electrode may proceed more smoothly.

Next, the composition for forming an inorganic electrolyte layer may include a compound represented by Formula 1 below.

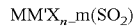 [Formula 1]

M is a metallic element selected from the group consisting of lithium (Li), sodium (Na), potassium (K), and rubidium (Rb), M' is a metallic element selected from the group consisting of aluminum (Al), gallium (Ga), indium (In), and titanium (Ti), X is a halogen element selected from the group consisting of F, Cl, Br, and I, n is an integer of 1 to 6, and m is an integer of 1 to 10.

More specifically, the compound represented by Formula 1 may include at least one compound selected from the group consisting of LiAlCl$_4$-3 (SO$_2$) and NaAlCl$_4$-2(SO$_2$).

In this case, the composition for forming an inorganic electrolyte layer may further include an inorganic ionic liquid.

Specifically, the inorganic ionic liquid may include at least one anion selected from the group consisting of bis(fluorosulfonyl)imide (hereinafter, abbreviated as 'FSI'), bis(trifluoromethylsulfonyl)imide (hereinafter, abbreviated as 'TFSI'), bis(pentafluoroethylsulfonyl)imide (hereinafter, abbreviated as 'PFSI'), and hexafluorophosphate (hereinafter, abbreviated as 'PF$_6$').

Also, the inorganic ionic liquid may include at least one cation selected from the group consisting of N,N-diethyl-N-methyl-N-(2-methoxyethyl)ammonium (hereinafter, abbreviated as 'DEME'), N-ethyl-N-methylpyrrolidinium (hereinafter, abbreviated as 'P12'), N-methyl-N-propylpyrrolidinium (hereinafter, abbreviated as 'P13'), N-butyl-N-methylpyrrolidinium (hereinafter, abbreviated as 'P14'), 1-ethyl-2,3-dimethylimidazolium (hereinafter, abbreviated as 'C2dmim'), 2,3-dimethyl-1-propylimidazolium (hereinafter, abbreviated as 'C3dmim'), 1-butyl-3-methylimidazolium (hereinafter, abbreviated as 'C4mim'), 1-butyl-2,3-dimethylimidazolium (hereinafter, abbreviated as 'C4dmim'), N-methyl-N-propyl piperidinium (hereinafter, abbreviated as 'PP13'), N-butyl-N-methylpiperidinium (hereinafter, abbreviated as 'PP14'), triethylpentylphosphonium (hereinafter, abbreviated as 'P2225'), and triethyloctylphosphonium (hereinafter, abbreviated as 'P2228').

Specifically, the inorganic ionic liquid may include at least one selected from the group consisting of P12-FSI, P12-TFSI, P12-PFSI, P12-PF$_6$, P13-FSI, P13-TFSI, P13-PFSI, P13-PF$_6$, P14-FSI, P14-TFSI, P14-PFSI, P14-PF$_6$, C2dmim-FSI, C2dmim-TFSI, C2dmim-PFSI, C2dmim-PF$_6$, C3dmim-FSI, C3dmim-TFSI, C3dmim-PFSI, C3dmim-PF$_6$, C4mim-FSI, C4mim-TFSI, C4mim-PFSI, C4mim-PF$_6$, C4dmim-FSI, C4dmim-TFSI, C4dmim-PFSI, C4dmim-PF$_6$, PP13-FSI, PP13-TFSI, PP13-PFSI, PP13-PF$_6$, PP14-FSI, PP14-TFSI, PP14-PFSI, PP14-PF$_6$, P2225-FSI, P2225-TFSI, P2225-PFSI, P2225-PF$_6$, P2228-FSI, P2228-TFSI, P2228-PFSI, and P2228-PF$_6$.

Furthermore, an inorganic polymer ionic liquid may be used as the inorganic ionic liquid.

Thereafter, after the electrode current collector is immersed in the composition for forming a first electrolyte layer, a current is applied to form a first electrolyte layer.

An electrochemical oxidation reaction (oxidation, A → A$^+$+e$^-$) occurs at an electrode current collector interface during the application of current, and the composition for forming a first electrolyte layer forms a first electrolyte layer while a reduction reaction (reduction, B$^+$+e$^-$ →B) occurs at the electrode current collector interface.

In this case, conditions of the applied current may vary depending on types of the electrode to be prepared or components of the composition for forming an electrolyte layer used, and the current conditions are not limited.

For example, the current may be applied such that a voltage is in a range of −1 V to 5.0 V, particularly −0.2 V to 4.5 V, and more particularly 0 V to 1.5 V from an open circuit voltage (OCV).

Even in a case in which the electrode is directly assembled in the form of a full cell and the full cell is then initially charged (formation stage) without being subjected to the separate electrolyte layer formation treatment step according to the present invention on the electrode for a lithium secondary battery, an electrolyte layer may be formed on the electrode for a lithium secondary battery by the electrolyte for a lithium secondary battery.

However, with respect to the components constituting the electrolyte layer, they may vary depending on the electrolyte composition, wherein, since other performances of the battery must also be considered in addition to the formation of the electrolyte layer, a side reaction may occur, for example, the solvent of the electrolyte for a lithium secondary battery is first decomposed during the formation of the electrolyte layer in an initial charging stage. There was a limitation in that the electrolyte layer was not stably and uniformly formed in the initial charging stage due to the side reaction.

In a case in which the electrolyte layer is not stably formed on the surface of the electrode for a lithium secondary battery, since the electrolyte layer may not suppress an interfacial reaction between the electrode/electrolyte and may also not control the flow of ions, the electrolyte layer may be easily collapsed under high-temperature conditions and/or overcharge conditions. If the electrolyte layer is collapsed, since the electrolyte layer may not suppress the electrode/electrolyte interfacial reaction, heat generation and thermal runaway due to the side reaction may occur, and thus, safety at high temperatures may also be deteriorated in addition to the degradation of life characteristics of the lithium secondary battery.

Therefore, in the present invention, the above-described limitation has been addressed by using the electrode, on which the electrolyte layer has already been formed, as the electrode for a lithium secondary battery. Also, in the present invention, chemical and mechanical performance may also be improved by forming both the organic electrolyte layer and the inorganic electrolyte layer.

After the first electrolyte layer is formed on the electrode current collector, the electrode current collector is separated. In a separation process, the electrode current collector may be dried, or a washing process for removing impurities may be further performed, but the process is not limited to a specific process and the treatment process may be performed without limitation.

(2) Second Electrolyte Layer Formation Step

Next, the step of forming a second electrolyte layer will be described.

In general, an organic electrolyte or inorganic electrolyte is used alone as an electrolyte for a lithium secondary battery in consideration of solubility between an organic compound and an inorganic compound. Thus, there is a limitation in that the electrolyte layer formed through a formation stage of the lithium secondary battery is formed as an organic electrolyte layer or an inorganic electrolyte layer.

However, even in a case in which the organic electrolyte is used, a portion of inorganic electrolyte components, such as LiF, may be included in the electrolyte layer, wherein, since the inorganic compound component, which may be formed only when the inorganic electrolyte is used, may not be included in the electrolyte layer when the organic electrolyte is used, chemical and mechanical stability of the lithium secondary battery is relatively low. In a case in which the inorganic electrolyte is used alone, since battery resistance is higher than a case where the organic electrolyte is used, operability of the lithium secondary battery may be low.

In the present invention, since the components of the electrolyte layer formed on the electrode for a lithium secondary battery in advance includes both reduction reactants of the organic compound and the inorganic compound, mechanical performance may be further improved by including the reduction reactant of the inorganic compound in the electrolyte layer even in the case that the organic compound is only included as the electrolyte for a lithium secondary battery and ionic conductivity may be further improved by including the reduction reactant of the organic compound in the electrolyte layer even in the case that the inorganic compound is only included as the electrolyte for a lithium secondary battery.

Thus, since the electrolyte layer components formed on the electrode interface include both the organic and inorganic compounds, the chemical and mechanical stability of the lithium secondary battery may be improved even in a case where any electrolyte is used as the electrolyte for a lithium secondary battery.

In a case in which the composition for forming an organic electrolyte layer is used to form the first electrolyte layer, the composition for forming an inorganic electrolyte layer is used to form the second electrolyte layer. In contrast, in a case in which the composition for forming an inorganic electrolyte layer is used to form the first electrolyte layer, the composition for forming an organic electrolyte layer is used to form the second electrolyte layer. Since descriptions of the composition for forming an organic electrolyte layer and the composition for forming an inorganic electrolyte layer are the same as those described above, the descriptions thereof will be omitted.

Also, in the case that the composition for forming a second electrolyte layer is the composition for forming an inorganic electrolyte layer, conditions of the applied current may vary depending on types of the electrode to be prepared or components of the composition for forming an electrolyte layer used, and the current conditions are not limited, wherein, for example, the current may be applied such that a voltage is in a range of −1 V to 5.0 V, particularly −0.2 V to 4.5 V, and more particularly 0 V to 1.5 V from an open circuit voltage (OCV).

After the second electrolyte layer is formed, the electrode current collector is separated. In a separation process, the electrode current collector may be dried, or a washing process for removing impurities may be further performed, but the process is not limited to a specific process, and the treatment process may be performed without limitation.

<Electrode for Lithium Secondary Battery>

An electrode for a lithium secondary battery according to the present invention includes an electrode current collector and an organic electrolyte layer and inorganic electrolyte layer which are formed on the electrode current collector.

In this case, the organic electrolyte layer is formed by reduction of the composition for forming an organic electrolyte layer, and the inorganic electrolyte layer is formed by reduction of the composition for forming an inorganic electrolyte layer which includes the compound represented by Formula 1 below. For example, a compound formed by the reduction of the compound represented by the following Formula 1 includes LiCl, $Li_2SO_4$, or $Al_2O_3$, but the compound is not limited to the above-listed compounds.

Since descriptions of the electrode current collector, the composition for forming an organic electrolyte layer, the composition for forming an inorganic electrolyte layer, and the reduction process are the same as those described above, the descriptions thereof will be omitted.

$$MM'X_n\_m(SO_2) \quad \text{[Formula 1]}$$

M is a metallic element selected from the group consisting of Li, Na, K, and Rb, M' is a metallic element selected from the group consisting of Al, Ga, In, and Ti, X is a halogen element selected from the group consisting of F, Cl, Br, and I, n is an integer of 1 to 6, and m is an integer of 1 to 10.

The electrode for a lithium secondary battery according to the present invention may be a positive electrode or a negative electrode, and may be used in both the positive electrode and the negative electrode.

The organic electrolyte layer and the inorganic electrolyte layer each may form a separate layer, or the organic electrolyte layer and the inorganic electrolyte layer may be mixed and present in one layer. In a case in which the organic electrolyte layer and the inorganic electrolyte layer are mixed and present in one layer, the organic electrolyte layer and the inorganic electrolyte layer are not clearly distinguished, but there may be a difference in distribution of components in the electrolyte layer based on the electrode current collector interface.

Hereinafter, the present invention will be described in more detail, according to specific examples. However, the following examples are merely presented to exemplify the present invention, and the scope of the present invention is not limited thereto. It will be apparent to those skilled in the art that various modifications and alterations are possible within the scope and technical spirit of the present invention, and such modifications and alterations fall within the scope of claims included herein.

EXAMPLES

Example 1

After preparing a lithium metal thin film as a counter electrode, a lithium metal thin film as a reference electrode, and a copper metal thin film as a working electrode, $LiPF_6$ was mixed in a solvent, in which fluoroethylene carbonate (FEC), ethylene carbonate (EC), and ethyl methyl carbonate (EMC) were mixed in a volume ratio of 0.5:2.5:7, to have a concentration of 1 M (10 g), and 1 wt % of vinylene carbonate (VC) was then added as an additive to the mixture to prepare a composition for forming an organic electrolyte layer.

After the counter electrode, the reference electrode, and the working electrode were disposed in sequence and then immersed in the composition for forming an organic electrolyte layer, an organic electrolyte layer was formed by applying a current such that a voltage was 0.2 V from an open circuit voltage (OCV).

Then, after separating the working electrode on which the organic electrolyte layer was formed, the copper metal thin film, on which the organic electrolyte layer was formed, was prepared as a working electrode, a lithium metal thin film was prepared as a counter electrode, a lithium metal thin film was prepared as a reference electrode, and 10 g of a $LiAlCl_4$-$3(SO_2)$ solution was then prepared as a composition for forming an inorganic electrolyte layer.

After the counter electrode, the reference electrode, and the working electrode were disposed in sequence and then immersed in the composition for forming an inorganic electrolyte layer, an inorganic electrolyte layer was formed by applying a current such that a voltage was 0.2 V from an open circuit voltage (OCV). Thereafter, the working electrode was separated and then dried to prepare a negative electrode for a lithium secondary battery.

Example 2

A negative electrode for a lithium secondary battery was prepared in the same manner as in Example 1 except that a copper metal thin film, on which a lithium metal was deposited, was used as a working electrode and a current was applied such that a voltage was 0.2 V from an open circuit voltage (OCV) when an organic electrolyte layer and an inorganic electrolyte layer were formed.

Example 3

A negative electrode for a lithium secondary battery was prepared in the same manner as in Example 1 except that a graphite electrode was used as a working electrode.

Example 4

A negative electrode for a lithium secondary battery was prepared in the same manner as in Example 1 except that a solvent, in which fluoroethylene carbonate (FEC), ethylene carbonate (EC), ethyl methyl carbonate (EMC), and 2,2-bis(trifluoromethyl)-1,3-dioxolane (TFDOL) were mixed in a volume ratio of 0.5:2.5:6:1, was used as the solvent of the composition for forming an organic electrolyte layer.

Example 5

A negative electrode for a lithium secondary battery was prepared in the same manner as in Example 1 except that 1 wt % of vinylene carbonate (VC), 0.5 wt % of lithium difluoro(oxalate)phosphate (LiDFOP), and 1 wt % of 1,3-propenesultone (PRS) were used as the additive of the composition for forming an organic electrolyte layer.

Example 6

A negative electrode for a lithium secondary battery was prepared in the same manner as in Example 1 except that 30 wt % of (N-butyl-N-methylpyrrolidinium)-FSI (P14-FSI) was further added to the composition for forming an inorganic electrolyte layer as an inorganic ionic liquid.

Example 7

A negative electrode for a lithium secondary battery was prepared in the same manner as in Example 1 except that a current was applied such that a voltage was 0 V from an open circuit voltage (OCV) when an organic electrolyte layer was formed.

Example 8

A negative electrode for a lithium secondary battery was prepared in the same manner as in Example 1 except that a current was applied such that a voltage was 0 V from an open circuit voltage (OCV) when an inorganic electrolyte layer was formed.

Example 9

After preparing a lithium metal thin film as a counter electrode, a lithium metal thin film as a reference electrode, and a copper metal thin film as a working electrode, 10 g of a $LiAlCl_4\text{-}3(SO_2)$ solution was added to prepare a composition for forming an inorganic electrolyte layer.

After the counter electrode, the reference electrode, and the working electrode were disposed in sequence and then immersed in the composition for forming an inorganic electrolyte layer, an inorganic electrolyte layer was formed by applying a current such that a voltage was 0.2 V from an open circuit voltage (OCV). Thereafter, the working electrode, on which the inorganic electrolyte layer was formed, was separated and then dried.

Then, after the copper metal thin film, on which the inorganic electrolyte layer was formed, was prepared as a working electrode, a lithium metal thin film was prepared as a counter electrode, and a lithium metal thin film was prepared as a reference electrode, $LiPF_6$ was mixed in a solvent, in which fluoroethylene carbonate (FEC), ethylene carbonate (EC), and ethyl methyl carbonate (EMC) were mixed in a volume ratio of 0.5:2.5:7, to have a concentration of 1 M (10 g), and 1 wt % of vinylene carbonate (VC) was then added as an additive to the mixture to prepare a composition for forming an organic electrolyte layer.

After the counter electrode, the reference electrode, and the working electrode were disposed in sequence and then immersed in the composition for forming an organic electrolyte layer, an organic electrolyte layer was formed by applying a current such that a voltage was 0.2 V from an open circuit voltage (OCV). Thereafter, the working electrode was separated and then dried to prepare a negative electrode for a lithium secondary battery.

Example 10

A negative electrode for a lithium secondary battery was prepared in the same manner as in Example 9 except that a copper metal thin film, on which a lithium metal was deposited, was used as a working electrode and a current was applied such that a voltage was −0.2 V from an open circuit voltage (OCV) when an organic electrolyte layer and an inorganic electrolyte layer were formed.

Example 11

A negative electrode for a lithium secondary battery was prepared in the same manner as in Example 9 except that lithium bis(fluorosulfonyl)imide (LiFSI) was mixed in dimethyl ether (DME) to have a concentration of 3 M (10 g) and 1 wt % of vinylene carbonate (VC) was then added as an additive to the mixture to prepare a composition for forming an organic electrolyte layer.

Example 12

A negative electrode for a lithium secondary battery was prepared in the same manner as in Example 9 except that 1 wt % of vinylene carbonate (VC), 0.5 wt % of lithium difluoro(oxalate)phosphate (LiDFOP), and 1 wt % of LiBr were used as the additive of the composition for forming an organic electrolyte layer.

Example 13

A negative electrode for a lithium secondary battery was prepared in the same manner as in Example 9 except that 20 wt % of (1-butyl-3-methylimidazolium bis(fluorosulfonyl)imidazolium)-FSI (C4mim-FSI) was further added to the composition for forming an inorganic electrolyte layer as an inorganic ionic liquid.

Example 14

A negative electrode for a lithium secondary battery was prepared in the same manner as in Example 9 except that a current was applied such that a voltage was −0.2 V from an open circuit voltage (OCV) when an inorganic electrolyte layer was formed.

Example 15

A negative electrode for a lithium secondary battery was prepared in the same manner as in Example 9 except that a current was applied such that a voltage was −0.2 V from an open circuit voltage (OCV) when an organic electrolyte layer was formed.

Example 16

A positive electrode active material (($Li(Ni_{0.8}Co_{0.1}Mn_{0.1})O_2$), NCM811), a conductive agent (bundle-type carbon nanotubes), and a binder (polyvinylidene fluoride (PVDF)) were mixed in N-methyl-2-pyrrolidone (NMP), as a solvent, in a weight ratio of 97.7:0.3:2 to prepare a positive electrode active material slurry. A 20 μm thick aluminum thin film was coated with the positive electrode active material slurry, dried, and roll-pressed to prepare a positive electrode collector.

Thereafter, after preparing a lithium metal thin film as a counter electrode, a lithium metal thin film as a reference electrode, and the positive electrode collector as a working electrode, $LiPF_6$ was mixed in a solvent, in which fluoroethylene carbonate (FEC), ethylene carbonate (EC), and ethyl methyl carbonate (EMC) were mixed in a volume ratio of 0.5:2.5:7, to have a concentration of 1 M (10 g), and 1 wt % of vinylene carbonate (VC) was then added as an additive to the mixture to prepare a composition for forming an organic electrolyte layer.

After the counter electrode, the reference electrode, and the working electrode were disposed in sequence and then immersed in the composition for forming an organic electrolyte layer, an organic electrolyte layer was formed by applying a current such that a voltage was 4.25 V from an open circuit voltage (OCV).

Then, after separating the working electrode on which the organic electrolyte layer was formed, the copper metal thin film, on which the organic electrolyte layer was formed, was prepared as a working electrode, a lithium metal thin film was prepared as a counter electrode, a lithium metal thin film was prepared as a reference electrode, and 10 g of a $LiAlCl_4\text{-}3(SO_2)$ solution was then prepared as a composition for forming an inorganic electrolyte layer.

After the counter electrode, the reference electrode, and the working electrode were disposed in sequence and then immersed in the composition for forming an inorganic electrolyte layer, an inorganic electrolyte layer was formed by applying a current such that a voltage was 4.25 V from an open circuit voltage (OCV). Thereafter, the working electrode was separated and then dried to prepare a positive electrode for a lithium secondary battery.

COMPARATIVE EXAMPLES

Comparative Example 1

A copper metal thin film (thickness: 20 μm) was prepared as a negative electrode for a lithium secondary battery.

Comparative Example 2

A copper metal thin film (thickness: 20 μm) having a lithium metal deposited on a surface thereof was prepared as a negative electrode for a lithium secondary battery.

Comparative Example 3

A silicon (Si) electrode was prepared as a negative electrode for a lithium secondary battery.

Comparative Example 4

A graphite electrode was prepared as a negative electrode for a lithium secondary battery.

Comparative Example 5

After preparing a lithium metal thin film as a counter electrode, a lithium metal thin film as a reference electrode, and a copper metal thin film as a working electrode, $LiPF_6$ was mixed in a solvent, in which fluoroethylene carbonate (FEC), ethylene carbonate (EC), and ethyl methyl carbonate (EMC) were mixed in a volume ratio of 0.5:2.5:7, to have a concentration of 1 M (10 g), and 1 wt % of vinylene carbonate (VC) was then added as an additive to the mixture to prepare a composition for forming an organic electrolyte layer.

After the counter electrode, the reference electrode, and the working electrode were disposed in sequence and then immersed in the composition for forming an organic electrolyte layer, an organic electrolyte layer was formed by applying a current such that a voltage was 0.2 V from an open circuit voltage (OCV).

Then, the working electrode, on which the organic electrolyte layer was formed, was separated to prepare a negative electrode for a lithium secondary battery on which only the organic electrolyte layer was formed.

Comparative Example 6

After preparing a lithium metal thin film as a counter electrode, a lithium metal thin film as a reference electrode, and a copper metal thin film as a working electrode, 10 g of a $LiAlCl_4$-$3(SO_2)$ solution was prepared as a composition for forming an inorganic electrolyte layer.

After the counter electrode, the reference electrode, and the working electrode were disposed in sequence and then immersed in the composition for forming an inorganic electrolyte layer, an inorganic electrolyte layer was formed by applying a current such that a voltage was 0.2 V from an open circuit voltage (OCV). Thereafter, the working electrode, on which the inorganic electrolyte layer was formed, was separated and then dried to prepare a negative electrode for a lithium secondary battery on which only the inorganic electrolyte layer was formed.

Comparative Example 7

A positive electrode active material ($(Li(Ni_{0.8}Co_{0.1}Mn_{0.1})O_2)$, NCM811), a conductive agent (bundle-type carbon nanotubes), and a binder (polyvinylidene fluoride (PVDF)) were mixed in N-methyl-2-pyrrolidone (NMP), as a solvent, in a weight ratio of 97.7:0.3:2 to prepare a positive electrode active material slurry. A 20 μm thick aluminum thin film was coated with the positive electrode active material slurry, dried, and roll-pressed to prepare a positive electrode collector. The positive electrode collector was prepared as a positive electrode for a lithium secondary battery.

[Lithium Secondary Battery Preparation]

(1) Lithium Secondary Battery Preparation According to Examples 1 to 15 and Comparative Examples 1 to 6

94 wt % of a 4.2 V-class $LiCoO_2$ compound as a positive electrode active material, 4 wt % of carbon black as a conductive agent, and 2 wt % of PVDF, as a binder component, were added to N-methyl-2-pyrrolidone (NMP), as a solvent, to prepare a positive electrode active material slurry. A surface of a 20 μm thick aluminum (Al) thin film was coated with the positive electrode active material slurry to a thickness of 10 μm and then dried to prepare a positive electrode for a lithium secondary battery on which a positive electrode active material layer was formed.

$LiPF_6$ was added to an electrolyte solution, in which fluoroethylene carbonate (FEC), ethylene carbonate (EC), and ethyl methyl carbonate (EMC), as electrolytes for a lithium secondary battery, were mixed in a volume ratio of 5:25:70, to have a concentration of 1 M, and vinylene carbonate (VEC) was then added as an additive in an amount of 1 wt % based on a total weight of the electrolyte solution.

A polyethylene (PE) sheet was prepared as a separator. After an electrode assembly was prepared by sequentially stacking the above-prepared positive electrode, the separator, and each of the negative electrodes prepared according to Examples 1 to 16 and Comparative Examples 1 to 6, the electrode assembly was accommodated in a pouch-type battery case, and the electrolyte for a lithium secondary battery was then injected thereinto to prepare a 4.2 V-class lithium secondary battery (full cell) according to each of the examples and comparative examples.

(2) Lithium Secondary Battery Preparation According to Example 16 and Comparative Example 7

A mixture, in which a negative electrode active material (graphite), a conductive agent (carbon black), and a binder (polyvinylidene fluoride (PVDF)) were mixed in a weight ratio of 97:0.5:2.5, was added to distilled water, as a solvent, to prepare a negative electrode active material slurry. A 10 μm thick negative electrode collector (Cu thin film) was coated with the negative electrode active material slurry, dried, and roll-pressed to prepare a negative electrode.

$LiPF_6$ was added to an electrolyte solution, in which fluoroethylene carbonate (FEC), ethylene carbonate (EC), and ethyl methyl carbonate (EMC), as electrolytes for a lithium secondary battery, were mixed in a volume ratio of 5:25:70, to have a concentration of 1 M, and vinylene carbonate (VEC) was then added as an additive in an amount of 1 wt % based on a total weight of the electrolyte solution.

A polyethylene (PE) sheet was prepared as a separator. After an electrode assembly was prepared by sequentially stacking the above-prepared negative electrode, the separator, and each of the positive electrodes prepared according to Example 16 and Comparative Example 7, the electrode assembly was accommodated in a pouch-type battery case, and the electrolyte for a lithium secondary battery was then injected thereinto to prepare a 4.2 V-class lithium secondary battery (full cell) according to each of Example 16 and Comparative Example 7.

EXPERIMENTAL EXAMPLES

Experimental Example 1: Interfacial Resistance Measurement Test

After the lithium secondary batteries prepared in Examples 1 to 15 and the lithium secondary batteries prepared according to Comparative Examples 1 to 6 were subjected to formation at a current of 200 mA (0.1 C rate) and were aged at about 25° C. for 2 days, a degassing process was performed.

Then, interfacial resistance was measured using a Biologic VMP3 instrument (1 MHz-100 μHz range, 25° C. condition) before grading. In this case, the measured interfacial resistance of Example 1 was defined as reference interfacial resistance, and results of comparing each of the interfacial resistances relative to the reference interfacial resistance are presented in Table 1 below.

TABLE 1

|  | Interfacial resistance ratio (%, based on Example 1) |
|---|---|
| Example 1 | 100 |
| Example 2 | 80 |
| Example 3 | 42 |
| Example 4 | 81 |
| Example 5 | 85 |
| Example 6 | 109 |
| Example 7 | 101 |
| Example 8 | 102 |
| Example 9 | 100 |
| Example 10 | 80 |
| Example 11 | 75 |
| Example 12 | 83 |
| Example 13 | 112 |
| Example 14 | 100 |
| Example 15 | 100 |
| Comparative Example 1 | 200 |
| Comparative Example 2 | 160 |
| Comparative Example 3 | 250 |
| Comparative Example 4 | 150 |
| Comparative Example 5 | 138 |
| Comparative Example 6 | 146 |

Referring to Table 1, it may be confirmed that interfacial resistance ratios of the lithium secondary batteries prepared according to the examples were lower than interfacial resistance ratios of the lithium secondary batteries prepared according to the comparative examples.

Experimental Example 2: Capacity Evaluation of Lithium Secondary Battery

After the lithium secondary batteries prepared in Examples 1 to 16 and the lithium secondary batteries prepared according to Comparative Examples 1 to 7 were subjected to formation at a current of 200 mA (0.1 C rate) and were aged at about 25° C. for 2 days, a degassing process was performed.

Then, constant current/constant voltage (CC/CV) charging at 400 mA (0.2 C, 0.05 C cut-off) to 4.2 V and CC discharging at 1000 mA (0.5 C) to 3 V were performed on the lithium secondary batteries prepared in Examples 1 to 16 and the lithium secondary batteries prepared in Comparative Examples 1 to 7 under room temperature (25° C.) and high temperature (45° C.) conditions to measure capacities, the measured capacity of Example 1 was defined as reference capacity, and values of comparing each of the capacities relative to the reference capacity are presented in Table 2 below.

TABLE 2

| | Capacity Ratio (%, based on Example 1) | |
|---|---|---|
| | Room temperature (25° C.) | High temperature (45° C.) |
| Example 1 | 100 | 100 |
| Example 2 | 105 | 110 |
| Example 3 | 102 | 103 |
| Example 4 | 101 | 102 |
| Example 5 | 100 | 100 |
| Example 6 | 98 | 99 |
| Example 7 | 100 | 100 |
| Example 8 | 100 | 100 |
| Example 9 | 100 | 100 |
| Example 10 | 103 | 108 |
| Example 11 | 101 | 97 |
| Example 12 | 99 | 102 |
| Example 13 | 95 | 97 |
| Example 14 | 100 | 100 |
| Example 15 | 100 | 100 |
| Example 16 | 97 | 99 |
| Comparative Example 1 | 76 | 55 |
| Comparative Example 2 | 48 | 24 |
| Comparative Example 3 | 52 | 21 |
| Comparative Example 4 | 63 | 60 |
| Comparative Example 5 | 81 | 62 |
| Comparative Example 6 | 78 | 65 |
| Comparative Example 7 | 94 | 92 |

Referring to Table 2, it may be confirmed that capacity ratios of the lithium secondary batteries prepared according to the examples were higher than capacity ratios of the lithium secondary batteries prepared according to the comparative examples under both the room temperature (25° C.) and high temperature (45° C.) conditions.

Experimental Example 3: Battery High-temperature Cycle(Life) Measurement Test

After each of the lithium secondary batteries prepared in Examples 1 to 16 and the lithium secondary batteries prepared in Comparative Examples 1 to 7 was subjected to formation at a current of 200 mA (0.1 C rate) and were aged at about 25° C. for 2 days, a degassing process was performed.

Then, constant current/constant voltage (CC/CV) charging at 400 mA (0.2 C, 0.05 C cut-off) to 4.2 V and CC discharging at 1000 mA (0.5 C) to 3 V were set as one cycle, and 50 cycles were performed at a high temperature (45° C.) Thereafter, 50th discharge capacity and first initial capacity (discharge capacity in a state in which the first charge and discharge was performed) were used to calculate capacity retention and the results thereof are presented in Table 3.

TABLE 3

|  | Capacity retention after 50 cycles (%, high temperature (45° C.)) |
|---|---|
| Example 1 | 91 |
| Example 2 | 93 |
| Example 3 | 93 |
| Example 4 | 95 |
| Example 5 | 96 |
| Example 6 | 90 |
| Example 7 | 91 |
| Example 8 | 91 |
| Example 9 | 92 |
| Example 10 | 93 |
| Example 11 | 97 |
| Example 12 | 95 |

TABLE 3-continued

| | Capacity retention after 50 cycles (%, high temperature (45° C.)) |
|---|---|
| Example 13 | 87 |
| Example 14 | 91 |
| Example 15 | 91 |
| Example 16 | 95 |
| Comparative Example 1 | 0.2 |
| Comparative Example 2 | 5 |
| Comparative Example 3 | 0.5 |
| Comparative Example 4 | 7 |
| Comparative Example 5 | 62 |
| Comparative Example 6 | 38 |
| Comparative Example 7 | 72 |

Referring to Table 3, it may be confirmed that capacity retentions at a high temperature (45° C.) of the lithium secondary batteries prepared according to the examples were all higher than capacity retentions at a high temperature (45° C.) of the lithium secondary batteries prepared according to the comparative examples.

Experimental Example 4: High-Temperature Safety Evaluation (HOT Box Test)

After each of the lithium secondary batteries prepared in Examples 1 to 16 and Comparative Examples 1 to 7 was fully charged to a state of charge (SOC) of 100%, a test was performed in which each lithium secondary battery was left standing for 4 hours at 150° C. to confirm whether or not ignition occurred and time when the ignition started. The results thereof are presented in Table 4 below.

TABLE 4

| | Whether or not ignition occurred | Ignition start time (minutes) |
|---|---|---|
| Example 1 | x | — |
| Example 2 | x | — |
| Example 3 | x | — |
| Example 4 | x | — |
| Example 5 | x | — |
| Example 6 | x | — |
| Example 7 | x | — |
| Example 8 | x | — |
| Example 9 | x | — |
| Example 10 | x | — |
| Example 11 | o | 200 |
| Example 12 | x | — |
| Example 13 | x | — |
| Example 14 | x | — |
| Example 15 | x | — |
| Example 16 | x | — |
| Comparative Example 1 | o | 20 |
| Comparative Example 2 | o | 30 |
| Comparative Example 3 | o | 30 |
| Comparative Example 4 | o | 45 |
| Comparative Example 5 | o | 75 |
| Comparative Example 6 | o | 150 |
| Comparative Example 7 | o | 120 |

Referring to Table 4, it may be confirmed that the lithium secondary batteries prepared according to the examples, except for Example 11, were not ignited, but all of the lithium secondary batteries prepared according to the comparative examples were ignited. With respect to Example 11, ignition occurred, but it may be confirmed that ignition start time was later than those of the comparative examples.

The invention claimed is:

1. A method of preparing a positive electrode for a lithium secondary battery, comprising:
    forming an inorganic electrolyte layer directly on a positive electrode current collector by immersing the positive electrode current collector in a composition for forming the inorganic electrolyte layer and applying a current; and
    forming an organic electrolyte layer by immersing the positive electrode current collector having the inorganic electrolyte layer formed thereon in a composition for forming the organic electrolyte layer and applying a current,
    wherein
    the composition for forming the inorganic electrolyte layer comprises a compound represented by Formula 1:

$$MM'X_n \cdot m(SO_2) \quad \text{[Formula 1]}$$

M is a metallic element selected from the group consisting of lithium (Li), sodium (Na), potassium (K), and rubidium (Rb),
    M' is a metallic element selected from the group consisting of aluminum (Al), gallium (Ga), indium (In), and titanium (Ti),
    X is a halogen element selected from the group consisting of fluorine (F), chlorine (Cl), bromine (Br), and iodine (I),
    n is an integer of 1 to 6, and
    m is an integer of 1 to 10,
    the composition for forming the organic electrolyte layer comprises an organic solvent and a lithium salt, and
    the lithium salt includes $Li^+$ as a cation and at least one selected from the group consisting of $F^-$, $Cl^-$, $Br^-$, $I^-$, $NO_3^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $CF_3CF_2(CF_3)_2CO$, $(CF_3SO_2)_2CH^-$, $CF_3(CF_2)_7SO_3^-$, $CF_3CO_2^-$, $CH_3CO_2^-$, $SCN^-$, and mixture thereof.

2. The method of claim 1,
    wherein the organic solvent comprises at least one compound selected from the group consisting of a halogen element-substituted or unsubstituted carbonate-based compound, a halogen element-substituted or unsubstituted acetate-based compound, a halogen element-substituted or unsubstituted glyme-based compound, a halogen element-substituted or unsubstituted ether-based compound, and a halogen element-substituted or unsubstituted nitrile-based compound.

3. The method of claim 1, wherein the composition for forming the organic electrolyte layer further comprises an additive,
    wherein the additive comprises at least one compound selected from the group consisting of vinylene carbonate, vinylethylene carbonate, propanesultone, propenesultone, lithium difluoro (oxalato) phosphate, lithium difluoro (oxalato) borate, lithium tetrafluorooxalate phosphate, succinonitrile, succinic anhydride, ethylene sulfate, ethylene glycol bis (propionitrile) ether, lithium tetrafluoroborate, fluoroethylene carbonate, and lithium difluorophosphate.

4. The method of claim 1, wherein the compound represented by Formula 1 comprises at least one compound selected from the group consisting of $LiAlCl_4 \cdot 3(SO_2)$ and $NaAlCl_4 \cdot 2(SO_2)$.

5. The method of claim 1, wherein the composition for forming an inorganic electrolyte layer further comprises an inorganic ionic liquid.

6. A positive electrode for a lithium secondary battery, comprising a positive electrode current collector, an inorganic electrolyte layer and an organic electrolyte layer sequentially disposed in an order listed on the positive electrode current collector, wherein the inorganic electrolyte layer comprises a reduced compound of a compound represented by Formula 1:

MM'Xn-m(SO2)     [Formula 1]

M is a metallic element selected from the group consisting of lithium (Li), sodium (Na), potassium (K), and rubidium (Rb), M' is a metallic element selected from the group consisting of aluminum (Al), gallium (Ga), indium (In), and titanium (Ti), X is a halogen element selected from the group consisting of fluorine (F), chlorine (Cl), bromine (Br), and iodine (I), n is an integer of 1 to 6, and m is an integer of 1 to 10, wherein the organic electrolyte layer or the inorganic electrolyte layer is disposed on the positive electrode current collector.

7. The positive electrode for a lithium secondary battery of claim 6, wherein the organic electrolyte layer and the inorganic electrolyte layer are mixed and present in one layer.

8. The method of claim 1, wherein the current for forming the inorganic electrolyte is in a range of −1 V to 5.0 V from an open circuit voltage (OCV).

9. The method of claim 1, wherein the current for forming the inorganic electrolyte is in a range of −0.2 V to 4.5 V from an open circuit voltage (OCV).

10. The method of claim 1, wherein the current for forming the inorganic electrolyte is in a range of −0.2 V to 4.5 V from an open circuit voltage (OCV).

11. The electrode for a lithium secondary battery of claim 6, wherein a current in a range of −1 V to 5.0 V from an open circuit voltage (OCV) is applied for forming the inorganic electrolyte layer.

12. The electrode for a lithium secondary battery of claim 6, wherein a current in a range of −0.2 V to 4.5 V from an open circuit voltage (OCV) is applied for forming the inorganic electrolyte layer.

13. The electrode for a lithium secondary battery of claim 6, wherein a current in a range of −0.2 V to 4.5 V from an open circuit voltage (OCV) is applied for forming the inorganic electrolyte layer.

14. The method of claim 1, wherein the composition for forming an organic electrolyte layer comprises cyclic carbonate-based compound or linear carbonate-based compound.

15. The method of claim 1, wherein the composition for forming the organic electrolyte layer comprises at least one selected from the group consisting of ethylene carbonate, propylene carbonate, 1,2-butylene carbonate, 2,3-butylene carbonate, 1,2-pentylene carbonate, 2,3-pentylene carbonate, vinylene carbonate, and fluoroethyelen carbonate.

16. The method of claim 1, wherein the composition for forming the inorganic electrolyte layer comprises LiAlCl$_4$-3(SO$_2$).

17. The method of claim 1, wherein the composition for forming the inorganic electrolyte layer comprises NaAlCl$_4$-2(SO$_2$).

18. The method of claim 1, wherein a concentration of the lithium salt in the composition for forming the organic electrolyte layer is 1.0 M to 3.0 M.

* * * * *